(12) United States Patent
Mielewski et al.

(10) Patent No.: US 6,753,360 B2
(45) Date of Patent: Jun. 22, 2004

(54) SYSTEM AND METHOD OF PREPARING A REINFORCED POLYMER BY SUPERCRITICAL FLUID TREATMENT

(75) Inventors: Deborah Frances Mielewski, Ann Arbor, MI (US); Ellen Cheng-chi Lee, Ann Arbor, MI (US); Charles W Manke, West Bloomfield, MI (US); Esin Gulari, Detroit, MI (US)

(73) Assignees: Ford Global Technologies, LLC, Dearborn, MI (US); Wayne State University, Detroit, MI (US)

( * ) Notice: Subject to any disclaimer, the term of this patent is extended or adjusted under 35 U.S.C. 154(b) by 434 days.

(21) Appl. No.: 09/748,669

(22) Filed: Dec. 22, 2000

(65) Prior Publication Data

US 2002/0082331 A1 Jun. 27, 2002

(51) Int. Cl.⁷ .............................. C08J 3/20; C08K 9/06
(52) U.S. Cl. ........................ 523/216; 524/445; 528/483
(58) Field of Search .......................... 523/216; 524/445, 524/449, 451, 452, 480; 528/483; 252/378 R

(56) References Cited

U.S. PATENT DOCUMENTS

| | | | |
|---|---|---|---|
| 4,451,633 A | 5/1984 | Brownscombe et al. | |
| 4,748,220 A | 5/1988 | Hartmann et al. | |
| 4,845,056 A | 7/1989 | Yamanis | |
| 5,264,404 A | 11/1993 | Takahama et al. | |
| 5,312,882 A | 5/1994 | DeSimone et al. | |
| 5,382,623 A | 1/1995 | DeSimone et al. | |
| 5,385,776 A | 1/1995 | Maxfield et al. | |
| 5,506,317 A | 4/1996 | DeSimone et al. | |
| 5,589,105 A | 12/1996 | DeSimone et al. | |
| 5,616,286 A | 4/1997 | Jordan | |
| 5,639,836 A | 6/1997 | DeSimone et al. | |
| 5,679,737 A | 10/1997 | DeSimone et al. | |
| 5,814,678 A | 9/1998 | Randolph | |
| 5,910,523 A | 6/1999 | Hudson | |
| 6,469,073 B1 * | 10/2002 | Manke et al. ................ | 523/216 |

FOREIGN PATENT DOCUMENTS

| EP | 0 512 401 A2 | 11/1992 | |
|---|---|---|---|
| JP | 0053871 A1 * | 2/2000 | ......... C08L/101/00 |

OTHER PUBLICATIONS

Dekoninck Eric, The Supercritical Fluids—Reflection Conceived Within the Framework of the Research Department.

Armitsu Usuki et al, Synthesis of Nylon 6–Clay Hybrid, J. Mater, Res., vol. 8, No. 5, May 1993 © 1993 Materials Research Society, pp. 1179–1183.

NANOCOR—Nanoclays, Copyright © 1999, Nanocor.

James D. Destefani, Small But Mighty, Molding Systems—Oct. 1999, pp. 32, 34–36.

Bernie, Miller, 'Nana' clay particles create new components, May/Jun. 1997 Plastics Formulating & Compounding, pp. 30–32.

Trexel, Inc., Trexel Unveils Commercialization of MuCell Ómicroccellular Foam Process, © 1998 Trexel, Jun. 18, 1998, pp. 1–2.

Trexel, Inc., Injection Molding, Newsletters: vol. II—Fed. 2000, pp. 1–4.

Trexel, Inc., MuCell Technology Takes Off—Reprinted from European Plastics News—Jul./Aug. 2000, pp. 1–2.

Trexel, Inc., Microcellular Moulding, Reprinted from European Plastic News—Sep. 1998, pp. 1–3.

Bernie Miller, Tiny Clay Particles Pack Potent Properties Punch, Mechanical properties provided by set them apart from conventional mineral fillers—and there are other surprising differences too., Plastics World / Oct. 1997, pp. 36–38.

Yoshitsugu Kojima, Mechanical Properties of nylon 6–clay hybrid, J. Mater., Res., vol. 8, No. 5, May 1993 © 1993 Materials Research Society, pp. 1185–1189.

Arimitsu Usuki, Characteristics and Properties of Nylon 6–Clay Hybrid, Toyota Central Res. & Develop. Labs., Inc., pp. 651–652.

* cited by examiner

*Primary Examiner*—James J. Seidleck
*Assistant Examiner*—Thao Tran
(74) *Attorney, Agent, or Firm*—Brooks Kushman PC; Damian Porcari

(57) ABSTRACT

The present invention involves a method of preparing a reinforced polymer providing improved mechanical properties. The method includes providing particles of the layered silicate and a supercritical fluid. The method further includes mixing the layered silicate with a polymer to form a treatable silicate-polymer mixture and contacting the treatable mixture with the supercritical fluid to exfoliate the silicate particles so that the particles disperse within the polymer. The method further includes depressurizing the contacted mixture to exfoliate the layered silicate so that the layers are substantially dispersed within the polymer to define a reinforced polymer.

8 Claims, 1 Drawing Sheet

SYSTEM AND METHOD OF PREPARING A REINFORCED POLYMER BY SUPERCRITICAL FLUID TREATMENT

BACKGROUND OF THE INVENTION

1. Field of the Invention

The present invention relates to a method of preparing a reinforced polymer having improved mechanical properties.

2. Background Art

Plastics usage in the automotive industry is steadily increasing due to their light weight and continual improvements in mechanical properties. Currently, polymer-based materials may comprise at least percent of a given vehicle's weight. These materials are used in various automotive components, e.g., interior and exterior trim and side panels. As pressures to improve fuel economy continue, more steel and aluminum parts may be targeted for replacement by polymer-based materials. Thus, improvements in the mechanical properties of polymers are necessary in order to meet more stringent performance requirements. Mechanical properties of a polymer include stiffness, dimensional stability, modulus, heat deflection temperature, barrier properties, and rust and dent resistance, to name a few. Improved mechanical properties may reduce manufacturing costs by reducing the part thickness and weight of the manufactured part and the manufacturing time thereof.

There are a number of ways to improve the mechanical properties of a polymer, including reinforcement with particulate fillers or glass fibers. Currently, it is known that polymers reinforced with nanometer-sized platelets or particles of layered silicates or clay can impact significant improvements in mechanical properties at much lower loading than conventional fillers. This type of composite is termed a "nanocomposite". More specifically, polymer-silicate nanocomposites are compositions in which nano-sized particles of a layered silicate, e.g., montmorillonite clay, are dispersed into a thermoplastic or a thermoset matrix. The improvement in mechanical properties of nanocomposites is due to a combination of factors, such as high aspect ratio and surface area of the particles.

Typically, two steps are involved in producing reinforced polymers or polymer nanocomposites. The first step involves a process of conditioning or preparing the clay to make it more compatible with a selected polymer. The conditioning step is performed because the clay is generally hydrophilic and many polymer resins of interest are hydrophobic, thus rendering the two relatively incompatible.

In its natural state, clay is made up of stacks of individual particles held together by ionic forces. A cation exchange may be performed to exchange a naturally occurring inorganic cation with an organic cation. In addition, this process may increase the interlayer spacing between each particle, lessening the attractive forces between them. This allows the clay to be compatible with the polymer for subsequent polymerization or compounding. This preparatory step is known as "cation exchange". Generally, cation exchange is performed with a batch reactor containing an aqueous solution wherein an organic molecule, usually an alkyl ammonium salt, is dissolved into water along with the clay particles. The reactor is then heated. Once ion exchange takes place, the clay particles precipitate out and are then dried.

Depending on the polymer, a monomer may be further intercalated into the clay galleries. The organically modified clay is then ready for melt compounding to combine the clay with the polymer to make a workable material, or polymerizing monomers in the presence of the modified clay. Both the polymerization step and the melt compounding step involve known processing conditions in which the particles disperse and exfoliate in the polymer.

However, while this strategy is effective in more polar systems such as nylon, efforts to extend the technology to extremely non-polar polymers, such as polyolefins, have met with limited success. Many attempts at generating polyolefin based nanocomposites have been partially successful only by use of large amounts of compatibilizers. Not only is this prohibitively expensive, but the enhanced dispersion and exfoliation gained with the use of compatibilizers comes at the expense of matrix stiffness, since the compatibilizers are themselves of low molecular weight.

Additionally, because of the high melt viscosity of many thermoplastics, uniform dispersion of the layered silicate becomes difficult. On the other hand, in systems such as nylons and epoxies which can be polymerized in situ, intercalation of monomers and exfoliation of silicate layers is less of an issue. In situ polymerization of polyolefins, however, is plagued by sensitive and unstable catalysts.

Therefore, the use of supercritical fluids to both pretreat/delaminate silicate layers and to reduce melt viscosity is an attractive means of generating a well-exfoliated polymer silicate nanocomposite material for any material system.

SUMMARY OF THE INVENTION

Accordingly, it is an object of the present invention to provide an improved system and method of delaminating a layered silicate for producing reinforced polymers having improved mechanical properties.

The present invention also provides an improved method of preparing a reinforced polymer wherein the method includes providing particles or platelets of the layered silicate and a supercritical fluid and mixing the layered silicate particles with a polymer to form a treatable silicate-polymer mixture. The method further includes contacting the treatable mixture with the supercritical fluid and catastrophically or immediately depressurizing the contacted mixture to exfoliate the layered silicate particles so that the layered particles are substantially dispersed within the polymer to define the reinforced polymer.

The present invention also provides an improved reinforced polymer. The reinforced polymer includes a polymer mixed with a layered silicate having particle layers exfoliated by a supercritical fluid. The silicate layers are substantially exfoliated and dispersed within the polymer to provide reinforcement thereto.

DETAILED DESCRIPTION OF THE PREFERRED EMBODIMENT(S)

Figure 1:
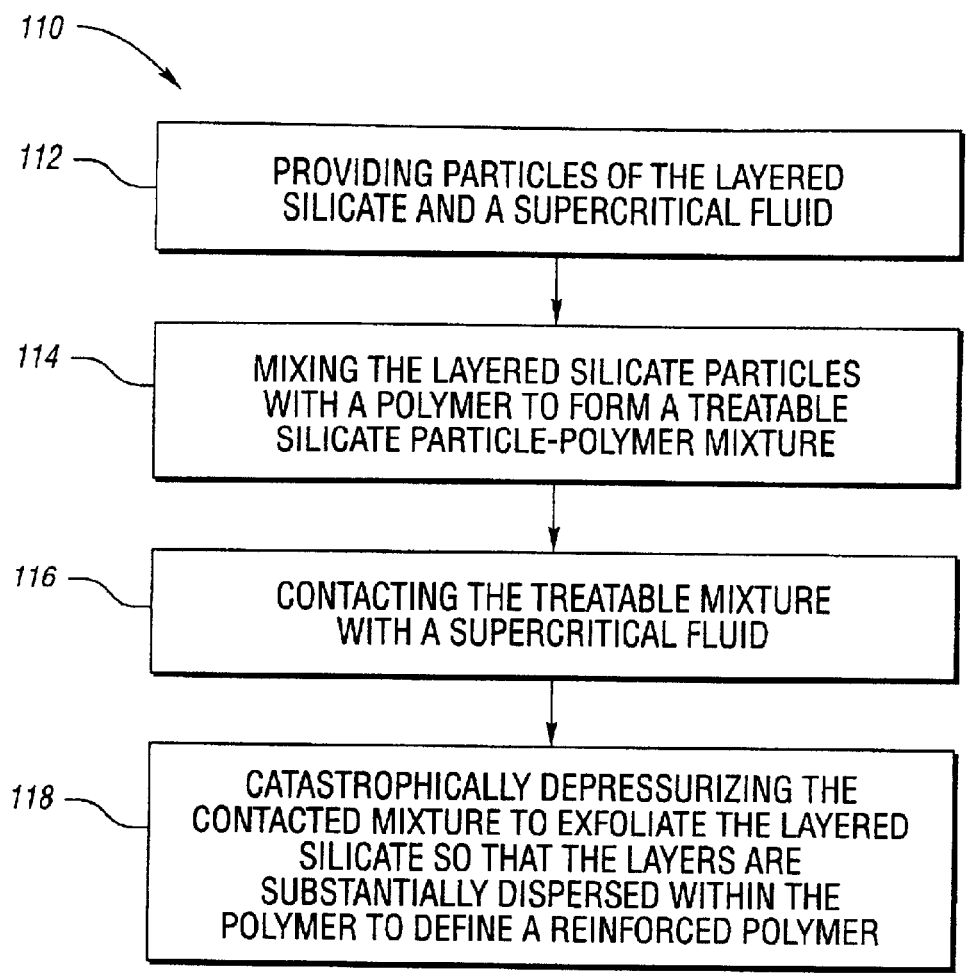
FIG. 1 is a flowchart depicting one method of preparing a reinforced polymer.

FIG. 1 depicts in 110 one method of preparing a reinforced polymer in accordance with the present invention. The method includes providing a layered silicate having layered particles or platelets, a polymer, and a supercritical fluid in box 112. In this embodiment, the layered silicate is a layered silicate clay called montmorillonite, a hydrophilic mineral, having a layered platey structure. The silicate has layered individual particles with thicknesses of about one nanometer and diameters of about 50 to more than 2000 nanometers. The polymer may be any suitable thermoplastic, such as a polyolefin. In this embodiment, the polymer is polypropylene.

In this embodiment, the supercritical fluid is preferably carbon dioxide which can exist as a fluid having properties of both a liquid and a gas when above its critical temperature and critical pressure. As known, carbon dioxide at its supercritical conditions has both a gaseous property of being able to penetrate through many materials and a liquid property of being able to dissolve materials into their components. As known, if a substance is heated and is maintained above its critical temperature, it becomes impossible to liquefy it with pressure. When pressure is applied to this system, a single phase forms that exhibits unique physicochemical properties. This single phase is termed a supercritical fluid and is characterized by a critical temperature and critical pressure. It has been known that supercritical fluids offer a favorable means to achieve solvating properties which have gas and liquid characteristics without actually changing chemical structure. By proper control of pressure and temperature, a significant range of physicochemical properties (density, diffusivity, dielectric constants, viscosity) can be accessed without ever passing through a phase boundary, e.g., changing from gas to liquid form.

The method shown in FIG. 1 may be completed with the use of a number of apparatus known in the art, such as a mixer, extruder, injection molding machine, or any other suitable apparatus capable of loading material such as clay, polymer and supercritical fluid, and capable of maintaining a constant pressure onto the loaded material. In this embodiment, the apparatus used is an extruder which applies a predetermined amount of pressure to the extrudate or material being extruded. The extruder includes at least two hoppers, first and second hoppers, connected thereto for loading polymer and clay, respectively. The source of supercritical fluid may be any conventional fluid source such as a gas cylinder containing the fluid of choice.

In this embodiment, the polymer is disposed through the first hopper in order to be loaded into the extruder. The layered silicate is also loaded through the second hopper in order to load the silicate into the extruder. As shown in box 114, the method includes mixing the layered silicate with the polymer to form a treatable silicate-polymer mixture. This is accomplished by loading the silicate and the polymer substantially simultaneously through the respective hoppers into the extruder to allow the silicate-polymer mixture to be extruded together therethrough. The extruder is heated so that the silicate-polymer mixture is a flowable melt.

Then, as shown in box 116, the method includes contacting the treatable silicate-polymer mixture with the supercritical fluid to define a contacted silicate-polymer mixture. This may be accomplished by injecting the supercritical fluid into the extruder while in the process of extruding the contacted silicate-polymer mixture. This step of contacting includes pressurizing the silicate-polymer mixture with the supercritical fluid to above about 1100 pounds per square inch gauge and heating the silicate-polymer mixture and the supercritical fluid to above the greater of the melting point of the polymer and the critical temperature of the supercritical fluid. In this embodiment, the melting temperature of polypropylene is about 165 degrees Celsius and the supercritical temperature of carbon dioxide is about 31 degree Celsius. Thus, in this embodiment, the step of contacting includes heating the silicate-polymer mixture to above about 165 degrees Celsius. However, it is to be noted that these conditions may change with different supercritical fluids and polymers used. Thus, other conditions may apply for other embodiments of the present invention.

Pressurizing and heating the silicate-polymer mixture with the supercritical fluid may be accomplished by any conventional means. In this embodiment, the mixture is pressurized by regulating the extrusion pressure placed upon the mixture during the extrusion process and by regulating the supercritical fluid being injected into the extruder from its source. The mixture is heated by conventional means. Contacting the mixture with the supercritical fluid further includes maintaining contact between the mixture and the fluid and shearing during the residence time or plasticizing time which may be between about 0.5 minute and 10 hours. As known, shearing of a mixture, such as the mixture of the present invention, is accomplished during extrusion of the mixture through the extruder.

The method further includes catastrophically or immediately depressurizing the contacted mixture to exfoliate silicate particles such that the particles are substantially dispersed, to define a treated silicate-polymer mixture. The step of depressurizing includes immediately depressurizing the extrudate down to ambient conditions. This may be accomplished when the extrudate exits the extruder, at which time the pressure drops to ambient. In this embodiment, as depressurizing occurs, heating is stopped, thus lowering temperature of the extrudate. As immediate depressurization occurs, the silicate-polymer mixture includes silicate particles which are substantially singly dispersed apart from each other within the polymer to define the reinforced polymer.

Although not wanting to be limited to any particular theory, it is believed that the polymer melt swells due to contact with the supercritical fluid, lowering the melt viscosity. The decreased viscosity allows the silicate particles to become intercalated by the supercritical fluid, resulting in exfoliation and dispersion of single particles. Further exfoliation occurs during depressurization. Thus, a substantially uniformly dispersed amount of treated silicate particles result within the polymer.

As a result, the reinforced polymer is formed having dispersed silicate particles within the polymer. The particles have high surface area contact with the silicate particles. The reinforced polymer includes between about 0.1 and 40 percent by weight of montmorillonite clay. Morever, the montmorillonite clay mixed in the reinforced polymer has a relatively substantial surface area to weight ratio. It is believed that the high surface area can substantially reinforce the polymer by an increase in interfacial interactions while having negligible added weight. It has been found that the reinforced polymer with the above-mentioned montmorillonite clay weight to surface area ratio and weight percent provides substantially increased mechanical properties at a lower manufacturing time and cost.

Figure 2:
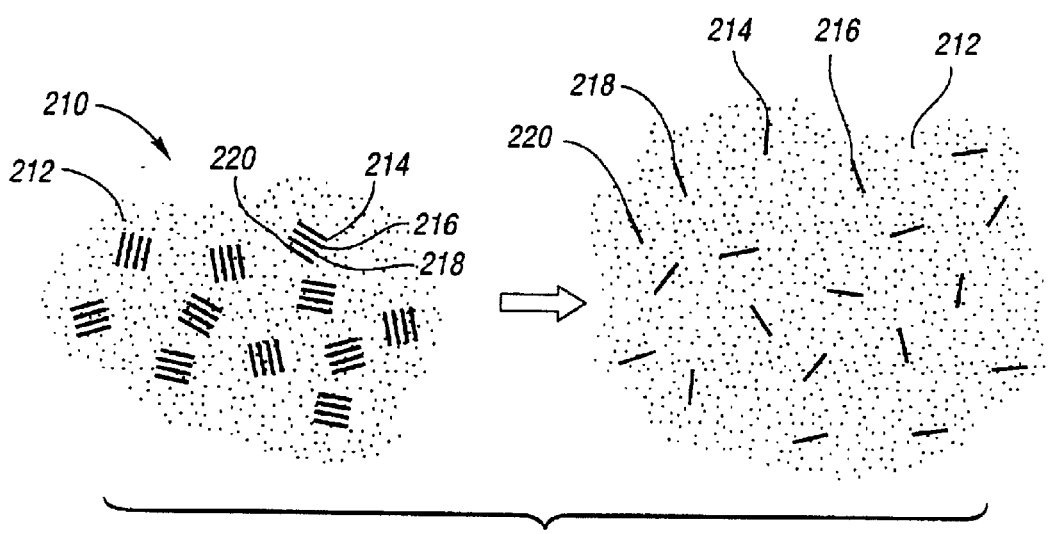
FIG. 2 is a cross-sectional view of conceptual images of the untreated silicate particles in a polymer and dispersed silicate particles exfoliated throughout a polymer in accordance with the present invention.

FIG. 2 depicts a conceptual image of layered silicate particles within a polymer prior to exfoliation and after exfoliation. As shown, the clay includes particles or platelets 214, 216, 218 with affinity therebetween within polymer 212. After depressurization, FIG. 2 shows exfoliated particles or platelets within a polymer 212. As shown, exfoliation of the silicate particles provides greater surface area about the particles such that the silicate particles may impart more reinforcement to the polymer.

In use, the reinforced polymer made in accordance with the present invention may be applied to form interior and exterior parts of a vehicle, e.g., interior trim panels, while requiring less weight than a typical vehicle part made by prior art technology. The reinforced polymer of the present invention allows parts to be relatively lighter in weight than previous parts, while providing the same or better mechanical properties. Additionally, due to the dimensional features of the particles, barrier properties of polymers are also enhanced, providing increased resistance to permeation. This provides the capability of using such reinforced polymers as barrier products, e.g., fuel tanks.

EXAMPLES

Example 1 is a method of preparing a reinforced polymer. In this example, the method provides for montmorillonite clay as the layered silicate, polypropylene resins as the polymer, and carbon dioxide as the supercritical fluid. The method then includes substantially simultaneously loading the clay and the polypropylene resins in a heated extruder through separate hoppers to define a treatable silicate-polymer mixture. The weight ratio of the loaded clay to loaded polypropylene is 1:19. During the extrusion process, carbon dioxide is applied to the mixture from a line connected to a high pressure carbon dioxide cylinder at about 1700 psig. The extruder extrudes the mixture in order to sufficiently mix the layered silicate with the polypropylene resins. The mixture is extruded at a temperature of about 200 degrees Celsius. The mixture remains at these conditions and is subjected to shear during the residence time of the extruder. The residence time of the mixture is maintained at between about 1 and 5 minutes. Thereafter, the extrudate exits the extruder and, thus, is immediately depressurized. As depressurization occurs, heating is stopped.

While the best mode for carrying out the invention has been described in detail, those familiar with the art to which this invention relates will recognize various alternative designs and embodiments for practicing the invention as defined by the following claims.

What is claimed is:

1. A method of generating a reinforced polymer, the method comprising:

providing particles of layered silicate and a supercritical fluid;

mixing the layered silicate particles with a polymer to form a treatable silicate-polymer mixture;

contacting the treatable mixture with the supercritical fluid to exfoliate the silicate so that the silicate particles disperse within the polymer; and depressurizing the contacted mixture to further exfoliate the silicate particles so that the particles are substantially dispersed within the polymer to define a reinforced polymer.

2. The method of claim 1 wherein the supercritical fluid is carbon dioxide.

3. The method of claim 1 wherein contacting the mixture includes pressurizing the mixture with the supercritical fluid to above the critical pressure of the supercritical fluid.

4. The method of claim 1 wherein contacting the mixture includes heating the mixture with the supercritical fluid to above the critical temperature of the supercritical fluid.

5. The method of claim 1 wherein contacting the mixture includes maintaining contact for between 0.5 minute and 10 hours.

6. The method of claim 1 wherein the silicate particles are substantially singly dispersed upon depressurization.

7. The method of claim 1 wherein the reinforced polymer includes between about 0.1 and 4.0 percent weight of the silicate particles.

8. The method of claim 1 wherein mixing includes shearing the silicate-polymer mixture.

* * * * *